(12) United States Patent
Lind et al.

(10) Patent No.: US 6,651,583 B1
(45) Date of Patent: Nov. 25, 2003

(54) METHOD AND A DEVICE FOR MILKING AN ANIMAL

(75) Inventors: Ole Lind, Tumba (SE); Benny Örnerfors, Järfälla (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 10/148,085

(22) PCT Filed: Nov. 14, 2000

(86) PCT No.: PCT/SE00/02232
§ 371 (c)(1),
(2), (4) Date: Sep. 23, 2002

(87) PCT Pub. No.: WO01/37646
PCT Pub. Date: May 31, 2001

(30) Foreign Application Priority Data

Nov. 24, 1999 (SE) .............................................. 9904259

(51) Int. Cl.⁷ ............................................... A01J 5/007
(52) U.S. Cl. .................................. 119/14.02; 119/14.14
(58) Field of Search ........................... 119/14.02, 14.08, 119/14.14–14.18, 14.47, 14.48, 14.15

(56) References Cited

U.S. PATENT DOCUMENTS 4,292,926 A * 10/1981 Tilman ..................... 119/14.02
5,054,425 A * 10/1991 Grimm et al. ............ 119/14.02
6,009,832 A * 1/2000 Innings et al. ............ 119/14.02

FOREIGN PATENT DOCUMENTS

| DE | 38 07 256 A1 | 9/1989 |
| DE | 195 21 569 A1 | 2/1997 |
| EP | 0 639 327 A1 | 2/1995 |
| EP | 0 727 137 A1 | 8/1996 |
| EP | 0 764 403 A1 | 3/1997 |
| GB | 2 191 927 A | 12/1987 |
| WO | WO 99/03330 | 1/1999 |

* cited by examiner

Primary Examiner—Yvonne Abbott
(74) Attorney, Agent, or Firm—Hovey Williams LLP

(57) ABSTRACT

The invention refers to a method and a device for milking an animal. The device comprises a milking machine arranged to permit milking of the animal according to a milking process being determined by a number of adjustable parameters defining the intensity of the milking process. The value of a variable related to the time period from at least one first milking operation to a following second milking operation is determined for the animal by determining means (31, 32). The animal is milked during the second milking operation by means of the milking machine, wherein at least one of said parameters is adjusted in response to said determined value by control means (30, 31).

20 Claims, 1 Drawing Sheet

METHOD AND A DEVICE FOR MILKING AN ANIMAL

BACKGROUND OF THE INVENTION AND PRIOR ART

The present invention refers to a method for milking an animal by means of a milking machine according to a milking process being determined by a number of adjustable parameters defining the intensity of the milking process. Furthermore, the invention refers to a device for milking an animal, comprising a milking machine arranged to permit milking of the animal according to a milking process being determined by a number of adjustable parameters defining the intensity of the milking process.

At many milking farms, the animals are milked more frequently today than previously. Frequent milking means relatively short milking intervals, i.e. the time period from one milking operation to the subsequent milking operation. In some cases, the milking interval is too short to enable a secure and complete milking of the animal, an appropriate stimulation and a satisfactory teat treatment. In particular, after a relatively short milking interval a long time period may be required between the attachment of the milking member to the teats and the milk let down. Furthermore, there is a risk of a too early removal of the milking member from the teats and that the teats are subjected to unnecessary stresses.

In voluntary milking systems, where the animals may walk about freely and visit the milking stall when they desire, the length of milking interval is less uniform than in traditional milking systems and occasionally the milking interval may be only two or three hours.

DE-A-13807256 discloses a method of milking. The method includes a continuous measurement of the milk flow. Changes in the milk flow are stored and used to control the milk intensity.

SUMMARY OF THE INVENTION

The object of the present invention is to remedy the problems caused by varying milking intervals.

This object is obtained by the method initially defined, which comprises the steps of:
- determining for the animal the value of a variable related to the time period from at least one first milking operation to a following second milking operation;
- milking the animal during the second milking operation by means of the milking machine; and
- adjusting in connection with the second milking operation of the animal at least one of said parameters in response to said determined value.

By determining the value of a variable related to the time period between two milking operations, for instance the length of the time period, and by adjusting one of said parameters, it is possible to adapt the second milking operation to the length of the time period from the first milking operation, which may be the immediately previous milking operation or any preceding milking operation. In the latter case, said determined value may thus be based on a series of short milking intervals, for instance. By the expression "intensity of the milking process" is meant the characteristic performance of the milking process in a broad sense. Consequently, the intensity is defined by a number of parameters including the time period of the milking process, the time period and the intensity of the preceding stimulation of the teats, other possible pretreatments of the teats such as cleaning, the milking vacuum level, the upper and lower levels of the pulsation pressure in the pulsation chamber, the pulsation frequency, the pulsation ratio, etc. Another word for milking intensity is the aggressiveness of the performance of the milking process.

According to a preferred embodiment of the invention, the adjustment of at least one of said parameters is such that the second milking operation is performed in a less intensive manner when the time period is relatively short and in a more intensive manner when the time period is relatively long. The advantage of such a performance of the second milking operation is a more gentle treatment of the teats, especially when the preceding milking interval is short, which reduces the risks for injuries on the teats and which may result in a higher milk yield.

According to a further embodiment of the invention, the adjustment is performed in an automatic manner. Moreover, the determining of said value may also be performed in an automatic manner. It is considered that the method according to the present invention is suitable for being performed in such an automatic manner, by utilising a database storing facts and parameters about the individual animals and offering the possibility to store the value of said variable, and by utilising control means for the adjustment of different milking machine parameters and the time points for different measures, such as terminating the stimulation period or initiating removal of the teatcups. Consequently, said adjustable parameters may include at least one of the milking vacuum level, the pulsation frequency, the duration of the preceding teat stimulation, the pulsation ratio, and the point of time for the removal of the teatcups.

According to a further embodiment of the invention, the adjustment of the milking vacuum level is such that the milking vacuum level during the second milking operation is relatively low when the time period is relatively short and relatively high when the time period is relatively long. Consequently, the milking intensity may be reduced by reducing the milking vacuum level (i.e. a relatively high pressure) during the second milking operation when the milking interval from the preceding milking operation is relatively short and by increasing the milking vacuum level (i.e. a relatively low pressure) when the milking interval is relatively long.

According to a further embodiment of the invention, the adjustment of the pulsation frequency is such that the pulsation frequency during the second milking operation is relatively low when the time period is relatively short and relatively high when the time period is relatively long. Consequently, a high milking intensity is obtained by a high pulsation frequency and a low milking intensity is obtained by a low pulsation frequency.

According to a further embodiment of the invention, the adjustment of the preceding teat stimulation is such that the stimulation period during the second milking operation is relatively long when the time period is relatively short and relatively short when the time period is relatively long. When the milking interval between subsequent milking operations is relatively short, a longer stimulation period is normally required to obtain milk let down.

According to a further embodiment of the invention, the adjustment of the pulsation ratio is such that the pulsation ratio during the second milking operation is relatively low when the time period is relatively short and relatively high when the time period is relatively long. Consequently, a low milking intensity is obtained by a low pulsation ratio and a high milking intensity is obtained by a relatively high pulsation ratio.

According to a further embodiment of the invention, the adjustment of the time period for the removal of the teatcups is such that the teatcups are removed at a relatively early point of time when the time period is relatively short and at a relatively late point of time when the time period is relatively long.

According to a further embodiment of the invention, the second milking operation is the next subsequent milking operation of the first milking operation. Consequently, the determined value is based on the immediately preceding milking interval.

The object mentioned above is also obtained by the device initially defined, which comprises a milking machine arranged to permit milking of the animal according to a milking process being determined by a number of adjustable parameters defining the intensity of the milking process, determining means for determining for the animal the value of a variable related to the time period from at least one first milking operation to a following second milking operation, and control means arranged to adjust at least one of said parameters of the milking machine in connection with the second milking operation of the animal at least one of said parameters in response to said determined value.

By such a device, the method of adjusting the parameters with regard to the preceding milking interval may be realised in a reliable manner. Preferred embodiments of the device according to the invention are defined in the dependent claims 13–15.

BRIEF DESCRIPTION OF THE DRAWING

The present invention is now to be disclosed more closely by means of the description of an embodiment and with reference to the drawing attached, in which FIG. 1 discloses schematically a device for milking an animal according to the present invention.

DETAILED DESCRIPTION OF DIFFERENT EMBODIMENTS OF THE INVENTION

Figure 1:
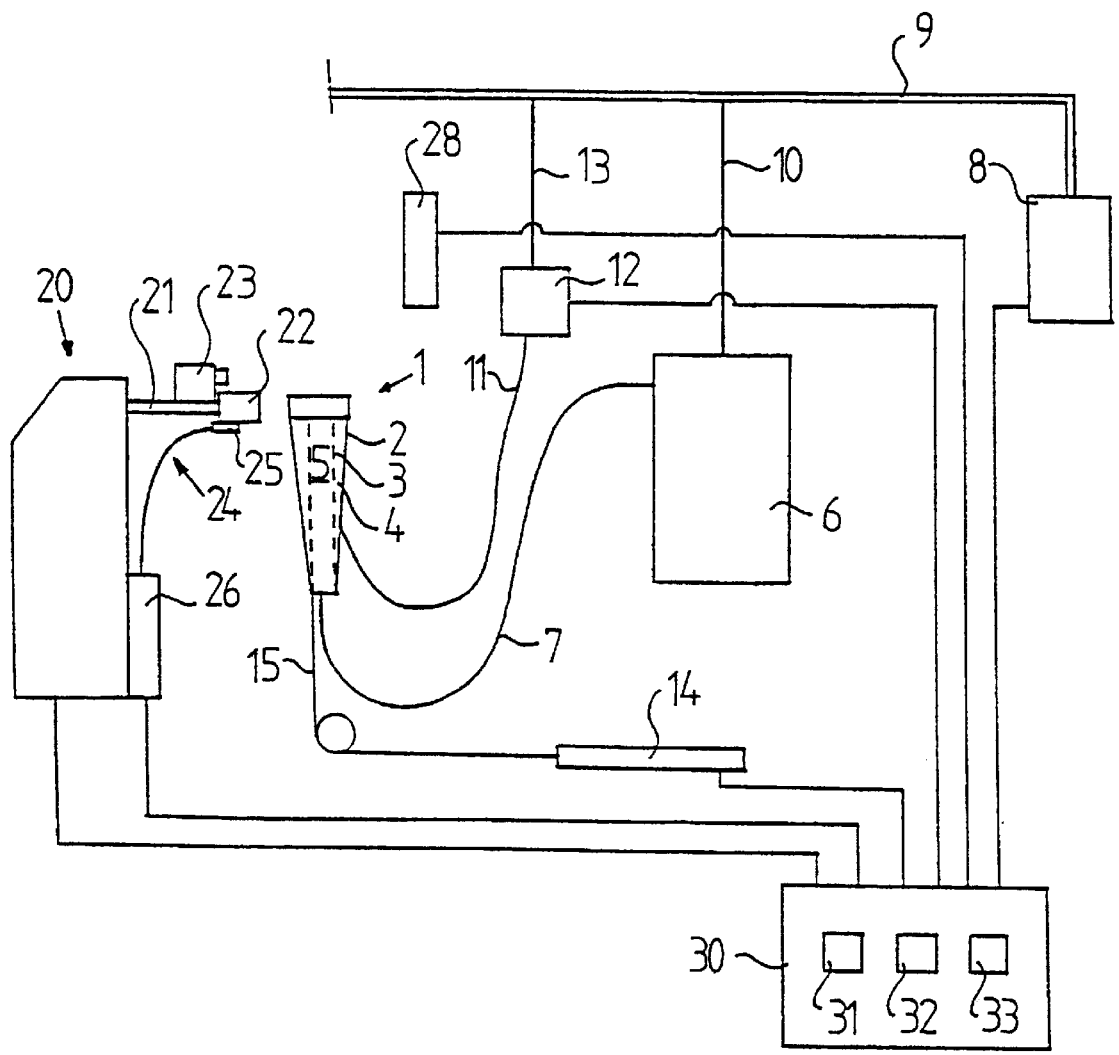

FIG. 1 discloses schematically a milking device for milking an animal. The milking device comprises a number of teatcups 1. The device referred to in this embodiment is adapted for milking of cows and therefore includes four teatcups 1, although only one teatcup 1 is disclosed in FIG. 1. Milking devices for other animals such as goats or buffaloes may include only two teatcups 1. The teatcup includes a shell 2 and a teatcup liner 3. A pulsation chamber 4 is formed between the shell 2 and the teatcup liner 3. The teatcup liner 3 encloses an inner space 5 adapted to receive a teat of the animal to be milked. The inner space 5 is connected to a milk-receiving member 6 via a milk conduit 7. The milk is conveyed from the teat to the milk-receiving member 6 by means of a milking vacuum produced by a vacuum pump 8 and transferred to the milk conduit 7 via a main vacuum conduit 9 and a milk vacuum conduit 10.

The pulsation chamber 4 is subjected to a pulsating pressure via a pulse conduit 11 and a pulsator 12 driven by a vacuum supplied to the pulsator from the vacuum pump 8 via the main vacuum conduit 9 and a pulse vacuum conduit 13. Due to the pulsating pressure, the teatcup liner 3 will move in cyclically, alternating movement between a closed position with regard to the inner space 5 and an open position with regard to the inner space. The ratio of the time that the teatcup liner 3 is more than half open to the time it is less than half open is defined as the pulsation ratio.

Furthermore, the device comprises a remover member 14 for the removal of the teatcups 1 from the teat of the animal. The remover member 14 comprises a pulling cylinder acting on a flexible cord 15 connected to the teatcup 1.

The milking device is arranged to permit automatic attachment of the teatcups 1 to the teats of the animal. Thereby, the milking device comprises an automatic handling equipment 20 including a robot arm 21 having a gripping member 22 arranged to grip the teatcup 1 from a teatcup magazine (not disclosed) and move the teatcup 1 towards the teat of the animal to be milked and thereafter attach the teatcup 1 to the teat. A video camera 23 or any similar teat identification member is mounted on the robot arm 21 in order to detect and sense the position of the teat.

Moreover, the milking device includes a spraying member 24, comprising a nozzle 25 mounted to the robot arm 21 and arranged to direct a jet of liquid towards the teat in order to clean the teat and thereby stimulate the teat. The nozzle 25 is connected to a liquid source 26 schematically disclosed. It is to be noted that the spraying member 24 disclosed in this embodiment merely is an example of a device for stimulating the teat to the milk let down. It is to be understood that the invention may incorporate other stimulating means, for example stimulating by means of the teatcup 1 attached to the teat, wherein the teatcup liner and the teat is subjected to a pulsation at a relatively high frequency, or a mechanical stimulating member.

Furthermore, the milking device includes an animal identification member 28, which is provided adjacent to the position at which the animal is milked. The animal identification member 28 is arranged to identify the animal to be milked, for instance by means of a transponder carried by the animal.

Different components of the milking device are controlled by a control unit 30. These components include a vacuum pump 8, the pulsator 12, the remover member 14, the automatic handling equipment 20, the spraying member 24, and the identification member 28. Although only one control unit 30 is disclosed in this embodiment, it is to be noted that the milking device may include several control units, for instance separate control units for the different components. The control unit 30 includes a processing member 31, a time-measuring member 32 and a storing member 33. By means of the time-measuring member 32, the point of time for different events may be detected. Such events include for instance the application of the teatcup 1 to a teat, the removal of the teatcup 1 from the teat, the beginning of the milk flow to the milk-receiving member 6 via the milk conduit 7, the end of the milk flow, beginning of the stimulation of a teat by means of the spraying member 24, the end of the stimulation period etc. The different points of time are stored in the storing member 33 and may be processed by the processing member 31 in order to determine different time intervals, for instance milking intervals between two subsequent milking operations.

By means of the control unit 30, different parameters defining the intensity of the milking process and related to the different components such as the vacuum pump 8, the pulsator 12, the remover member 14, the automatic handling equipment 20 and the spraying member 24, may be adjusted.

In accordance with the present invention, these parameters may be adjusted in response to the milking interval between two milking operations, e.g. two subsequent milking operations. Thereby, the point of time of the removal of the teatcup 1 after a first milking operation of a cow identified by the identification member 28 may be detected by the time-measuring member 32 and stored in the storing member 33. When the cow in question arrives in the milking stall once again for the subsequent second milking operation, she is identified by the identification member 28 and the point of time of the application of the teatcup 1 to the teat, for instance, may be detected by the timemeasuring member 32. By means of these two detected points of time, the processing member 31 may determine the milking interval between the two subsequent milking operations. Thereafter, the intensity of the subsequent second milking operation may be controlled by adjusting one or several of said parameters in response to the length of said milking interval. The adjustment of said parameters is such that the second milking operation is performed in a less intensive manner when the milking interval is relatively short and in a more intensive manner when the milking interval is relatively long.

The parameters defined above may be adjusted in a number of different ways in order to control the milking intensity. For instance, the vacuum pump 8 may be controlled in order to increase or decrease the milking vacuum level acting on the teat to extract milk from the udder of the animal. A relatively high milking vacuum level corresponds to a relatively high milking intensity and a relatively lower milking vacuum level corresponds to a lower milking intensity.

Furthermore, the control unit 30 may be arranged to control the pulsator 12 in order to adjust the pulsation frequency, wherein a high frequency corresponds to a high milking intensity and a lower pulsation frequency corresponds to a lower milking intensity. The control unit 30 may also be arranged to control the pulsator 12 in such a manner that the pulsation ratio is adjusted, wherein a higher pulsation ratio, i.e. a relatively long open phase of the teatcup liner 3, corresponds to a high milking intensity and a lower pulsation ratio corresponds to a lower milking intensity.

Furthermore, the control unit 30 may be arranged to control the remover member 14, and more exactly the point of time for the removal of the teatcup 1 from the teat. In case of a relatively low milking intensity, the teatcup 1 may be removed at an earlier point of time than in case of a higher milking intensity.

The milking intensity may also be controlled by adjusting the time period or the efficiency of the stimulation of the teat prior to the actual milking. A more efficient stimulation corresponds to a higher milking intensity than a less efficient stimulation. Moreover, the milking intensity may be raised by increasing the time period for the stimulation.

It is to be noted that the milking intensity may be controlled by other parameters than the parameters mentioned above. The parameters mentioned in the application are to be regarded as examples. It is also to be noted that the milking intensity may be controlled by adjusting not only one but a combination of different parameters. The milking intensity may not only be controlled with respect to the milking interval between two subsequent milking operations, but also with respect to, for instance, an average milking interval calculated on a series a preceding milking intervals.

The present invention is not limited to the embodiments described above but may be varied and modified within the scope of the following claims.

What is claimed is:

1. A method for milking an animal by means of a milking machine according to a milking process being determined by a number of adjustable parameters defining the intensity of the milking process, wherein the method comprises the steps of:

determining for the animal the value of a variable related to the time period from at least one first milking operation to a following second milking operation;

milking the animal during the second milking operation by means of the milking machine; and adjusting in connection with the second milking operation of the animal at least one of said parameters in response to said determined value.

2. A method according to claim 1, wherein the adjustment of at least one of said parameters is such that the second milking operation is performed in a less intensive manner when the time period is relatively short and in a more intensive manner when the time period is relatively long.

3. A method according to claim 2, wherein the adjustment is performed in an automatic manner.

4. A method according to claim 2, wherein the determining of said value is performed in an automatic manner.

5. A method according to claim 1, wherein the adjustment is performed in an automatic manner.

6. A method according to claim 1, wherein the determining of said value is performed in an automatic manner.

7. A method according to claim 1, wherein said adjustable parameters include at least one of the milking vacuum level, the pulsation frequency, the duration of the preceding teat stimulation, the pulsation ratio, and the point of time for the removal of teatcups.

8. A method according to claim 7, wherein the adjustment of the milking vacuum level is such that the milking vacuum level during the second milking operation is relatively low when the time period is relatively short and relatively high when the time period is relatively long.

9. A method according to claim 7, wherein the adjustment of the pulsation frequency is such that the pulsation frequency during the second milking operation is relatively low when the time period is relatively short and relatively high when the time period is relatively long.

10. A method according to claim 7, wherein the adjustment of the preceding teat stimulation is such that the stimulation period during the second milking operation is relatively long when the time period is relatively short and relatively short when the time period is relatively long.

11. A method according to claim 7, wherein the adjustment of the pulsation ratio is such that the pulsation ratio during the second milking operation is relatively low when the time period is relatively short and relatively high when the time period is relatively long.

12. A method according to claim 7, wherein the adjustment of the time period for the removal of the teatcups is such that the teatcups are removed at a relatively early point of time when the time period is relatively short and at a relatively late point of time when the time period is relatively long.

13. A method according to claim 7, wherein the second milking operation is the next subsequent milking operation of the first milking operation.

14. A method according to claim 1, wherein the second milking operation is the next subsequent milking operation of the first milking operation.

15. A device for milking an animal, comprising:

a milking machine arranged to permit milking of the animal according to a milking process being determined by a number of adjustable parameters defining the intensity of the milking process, determining means for determining for the animal the value of a variable related to the time period from at least one first milking operation to a following second milking operation, and control means arranged to adjust at least one of said parameters of the milking machine in connection with the second milking operation of the animal at least one of said parameters in response to said determined value.

16. A device according to claim 15, wherein the control means is arranged to adjust at least one of said parameters in an automatic manner.

17. A device according to claim 16, wherein the determining means is arranged to determine said value in an automatic manner.

18. A device according to claim 17, comprising storing means arranged to store the value of said variable.

19. A device according to claim 15, wherein the determining means is arranged to determine said value in an automatic manner.

20. A device according to claim 15, comprising storing means arranged to store the value of said variable.

* * * * *